June 30, 1959 E. J. FILSINGER 2,892,337
TILE MOLDING FOR SINK AND DRAINBOARD CONSTRUCTION
Filed April 23, 1957
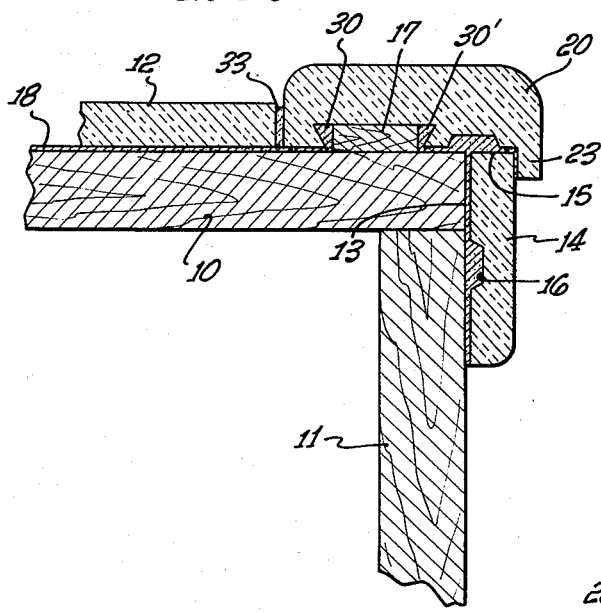
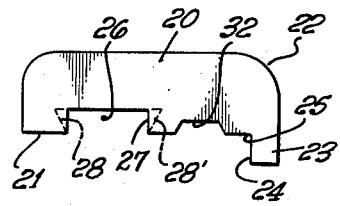
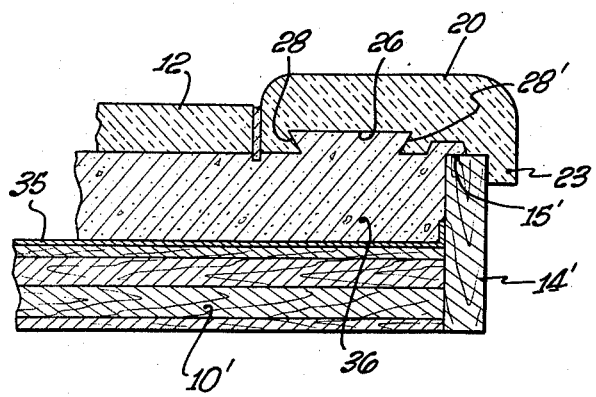
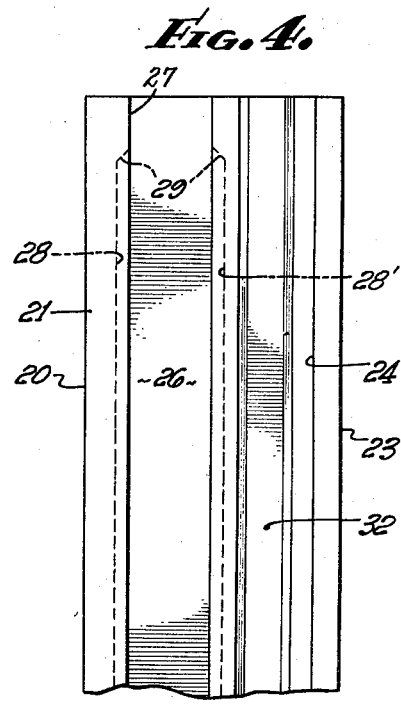
ELMER J. FILSINGER, INVENTOR.
BY
ATTORNEYS.

United States Patent Office 2,892,337
Patented June 30, 1959

2,892,337

TILE MOLDING FOR SINK AND DRAINBOARD CONSTRUCTION

Elmer J. Filsinger, Glendale, Calif., assignor to Gladding, McBean & Co., Los Angeles, Calif., a corporation of California Application April 23, 1957, Serial No. 654,520

3 Claims. (Cl. 72—.5)

This invention relates to a simplified construction for sinks, drainboards, and the like, and is particularly directed to ceramic elements which simplify the construction of sinks and drainboards provided with ceramic glazed tile as a surfacing.

The use of ceramic tile for surfaces of drainboards, lavatories, sinks, and the like is greatly desired in view of the durability of such surfacing materials, the readiness with which they are cleaned, and the great variety of permanent colors in which the tile are available. Normal methods of construction, however, are rather expensive and time consuming. A great deal of care must be taken in the placement of the tile, their alignment, etc., in order to prevent the resulting structure, and particularly the edge portions thereof, from becoming loose. Moreover, in many instances it is desirable to combine the ceramic glazed surfacing with lower wood construction and wood facings, and the joining of these two totally dissimilar materials has also involved many problems. Since the sinks, drainboards, lavatories, and the like are always subject to contact with large quantities of water, care must be taken that the resulting structure is thoroughly water tight and water resistant.

The structure described hereinafter can be installed with great facility and many of its advantages flow from the use of a ceramic cap element which receives cementitious materials, adhesives, cements, and other bonding agents and becomes immobilized against longitudinal and lateral movement or displacement as soon as such cementitious material or adhesive has set or hardened. Moreover, the novel ceramic cap element is provided with reentrant angles and faces which completely enclose stretcher elements or the like providing a water proof corner which is easily installed and aligned.

An object of the present invention is, therefore, to disclose and provide a simplified construction for sinks, drainboards, lavatories, and the like.

A further object of the invention is to disclose and provide improved ceramic elements particularly adapted for use in the construction of sinks, drainboards, and the like.

Other objects, advantages, as well as details of construction will become apparent from examples illustrated in the appended drawings wherein:

Fig. 1 is a transverse section through a corner or edge of a drainboard constructed from the elements of the present invention;

Fig. 2 is a transverse section through a modified form of construction, utilizing substantially the same primary elements;

Fig. 3 is an end view of a ceramic cap element used in the forms illustrated in Figs. 1 and 2;

Fig. 4 is a bottom view of one end portion of a ceramic cap element made in accordance with the present invention.

Fig. 1 illustrates a corner of a drainboard or the like wherein a wooden supporting element 10 in a horizontal plane is provided as the supporting surface, whereas 11 indicates another frontal and vertical element, the two being connected together in any suitable manner as by means of screws, nails, or the like. Resting upon the upper horizontal planar surface of the supporting element 10 are glazed ceramic tile such as 12. It is to be understood that such ceramic tile are generally glazed only along their upper surfaces and edges, whereas the bottom face is unglazed and lightly absorptive so as to facilitate bonding with cements, adhesives, and the like.

The supporting element 10 is provided with a longitudinal edge 13. This edge, as well as the upper portion of the vertical element 11 is covered by a series of aligned longitudinally extending ceramic stretcher elements 14, such stretcher elements being provided with longitudinally extending and upwardly facing flat edge portions such as 15. Again such stretcher 14 may be provided with a glazed outer face and an unglazed inner face which may also be provided with a groove or grooves such as 16. The entire inner face of the stretcher 14 is adhesively secured to the longitudinal edge 13 of the supporting element by means of a suitable cement water resisting solvent type adhesive or the like, the adhesive being shown extending into the recess or groove 16.

A relatively thin preferably pre-treated wooden strip 17 is fastened to the upper surface of supporting element 10 in alignment with the longitudinal edge 13 of the element 10. This wooden strip 17 is preferably impregnated with oil, resin or other preservative prior to its application to the top surface of supporting element 10 or the entire upper surface of the supporting element 10, as well as the strip 17, may be treated to resist impregnation with water. A layer of adhesive or other suitable cementitious material indicated at 18 is then placed over the entire upper surface of the supporting element 10, as well as the aligning strip 17 and the various ceramic tile 12, as well as the cap element 20 are then bedded down upon the adhesive or cement.

The ceramic cap element 20 is provided with a substantially flat planar unglazed lower face 21 and a glazed outer surface 22. The cap element 20 is provided with a downwardly extending lip 23 along one longitudinal edge portion of the face 21, this lip 23 having a longitudinal surface 24 meeting said lower face portion 21 to form a right angle corner indicated at 25 (see Fig. 3) adapted to engage and enclose the upper edge and face 15 of the stretcher 14 as shown in Fig. 1.

The lower unglazed face 21 of the cap element 20 is also provided with a groove extending completely from one end to the other of such face. This groove is generally indicated in Fig. 3 by the numeral 26. The end portions of the groove 26 are of rectangular section as indicated at 27, whereas intermediate portions of the groove 26 are dove-tailed and provided with oppositely inclined side walls 28 and 28'. These oppositely inclined side walls 28 and 28' terminate in shoulders such as 29 at the juncture of the dove-tailed groove with the rectangular groove end portions 27.

It will be evident, therefore, that the aligning strip 17 may extend along the entire length of the drainboard or sink and the various cap elements 20 may be positioned in proper alignment with respect to the edge 13 and the stretcher 14, the aligning strip 17 extending through the continuous grooves formed in the lower base 21 of the cap elements. Since this aligning strip 17 has also been covered with a suitable adhesive or cement, such cement 18 enters the dovetailed portion of the groove 26 as indicated at 30 and 30' in Fig. 1. The cement or adhesive in the dove-tailed portions will bond the ceramic cap element to the aligning strip 17 and since the end portions of each groove are substantially rectangular and fit closely about the aligning strip 17, the cap element 20 is immobilized as soon as such adhesive or cement has set, and cannot move laterally, longitudinally or vertically.

It may be noted that the groove 26 formed in the cap element 20 is preferably located adjacent that edge of the cap element which is free from the lip 23, that is the groove 26 is spaced from the lip 23 firmly anchoring the cap at a zone spaced from the outer edge of the finished drainboard or sink.

In addition the lower face 21 of the cap may also include another groove such as is indicated at 32 in Fig. 3, but in all instances a planar portion of the face 21 should meet the vertical, longitudinal face 24 of the lip 23 so as to form a right angled corner 25, this corner facilitating alignment and completely enclosing the upper edge portion of the stretcher 14 and insuring stability to the cap when it is installed.

The various tile are generally spaced slightly from the cap 20 and from each other, and after being bedded in the manner described a suitable water proof cement of a desired color is grouted into these narrow spaces as indicated at 33.

Fig. 2 illustrates a modified form of construction wherein the cap 20 provided with its lip 23 encloses the upper longitudinal edge portion of a pretreated wooden stretcher 14' attached to the wooden supporting element 10' (here shown as being of plywood). In the construction illustrated in Fig. 2 the upper edge of the stretcher 14' is located in a plane above the upper surface of the supporting element 10'. This upper surface of the supporting element is first covered with a layer of asphalt impregnated building paper or other type of water proof membrane material 35. The upper edge 15' of the stretcher 14' may then be used as a guiding edge for the leveling out of a bed of suitable mortar, cement or the like indicated at 36. A small excess of cement may be left adjacent the stretcher 14' so that when the ceramic cap elements 20 are bedded upon the cement 36 such cement will enter and fill the groove 26 in the cap element 20. Again the cement 36 will not only extend into the end portions 27 of the groove 26 but also come into contact with the outwardly inclined walls 28 and 28' of the dove-tailed portion of the groove 26 thereby firmly locking, bonding and immobilizing the cap. Other areas of the drainboard are then covered with the desired rectangular, octagonal or other glazed ceramic tile 12. It will be noted that in this construction glazed ceramic tile are only used for the horizontal surface of the drainboard and for the edge, whereas all vertical surfaces of the drainboard are of wood or other composition.

I claim:

1. In a simplified sink and drainboard construction the provision of a wooden supporting element in a horizontal plane having a planar top surface and a longitudinal edge; a substantially water impervious stretcher element connected to said longitudinal edge, said stretcher element lying in a vertical plane and being provided with a longitudinally extending and upwardly facing flat edge portion; a longitudinally extending ceramic cap member lying in a horizontal plane, said cap member having a lower planar face and including a downwardly extending longitudinal lip extending to a plane spaced from and below the lower planar face and including a vertical longitudinal surface meeting a portion of said lower face to form a right angled corner engaging and enclosing the upwardly facing flat edge portion of the stretcher element; the lower face of said cap element being provided with a groove extending from one end to the other of said face, end portions of said groove being of rectangular section and the intermediate portion of the groove being dove-tailed; and a cementing material between the top surface of the supporting element and the lower face of the cap member, said cementing material extending into the dove-tailed groove and immobilizing the cap member from longitudinal, lateral and vertical movement.

2. In a construction as stated in claim 1, the provision of an aligning strip carried by the top surface of the wooden supporting element, said aligning strip extending into the groove formed in the lower face of the cap element, and said cementing material extending into the dove-tailed intermediate portion between the alignment strip and the walls of the groove.

3. In a simplified sink and drainboard construction, the provision of: a supporting element in a horizontal plane having a planar top surface and a longitudinal edge; a substantially water-impervious stretcher element connected to said longitudinal edge, said stretcher element lying in a vertical plane and being provided with a longitudinally extending and upwardly facing flat edge portion in horizontal alignment with said planar top surface on said supporting element; an elongated aligning strip of rectangular section carried by said top surface of said supporting element and being spaced horizontally from and parallel to said flat edge portion of the stretcher element; a longitudinally extending ceramic cap member lying in a horizontal plane, said cap member having a lower planar face and including a downwardly extending longitudinal lip extending to a plane spaced from and below the lower planar face and including a vertical longitudinal surface meeting a portion of said lower face to form a right angled corner engaging and enclosing the upwardly facing flat edge portion of the stretcher element; the lower face of said cap element being provided with a groove extending from one end to the other of said face, end portions of said groove being of rectangular section and the intermediate portion of the groove being dove-tailed; said aligning strip extending into said groove and having its upper surface in engagement with the bottom of said groove so that the lower planar face of the cap member is spaced from the top surface of the supporting element; and a cementing material between the top surface of the supporting element, the upwardly facing flat edge portion of the stretcher element, and the lower face of the cap member, said cementing material extending into the dove-tailed intermediate portion between the rectangular aligning strip and the walls of the groove to immobilize the cap member from longitudinal, lateral and vertical movements.

References Cited in the file of this patent

UNITED STATES PATENTS

| | | |
|---|---|---|
| 463,851 | Bogert | Nov. 24, 1891 |
| 478,656 | Strusholm | July 12, 1892 |
| 796,918 | Marlow | Aug. 8, 1905 |
| 987,542 | Booraem | Mar. 21, 1911 |
| 1,453,945 | Peterson | May 1, 1923 |
| 1,716,224 | Friderichsen | June 4, 1929 |
| 1,807,630 | McFarlin | June 2, 1931 |

FOREIGN PATENTS

| | | |
|---|---|---|
| 283,775 | Great Britain | Jan. 19, 1928 |
| 355,314 | Great Britain | Aug. 10, 1931 |
| 337,806 | France | June 6, 1904 |